United States Patent [19]

Sikora

[11] Patent Number: 4,648,781
[45] Date of Patent: Mar. 10, 1987

[54] AUTOMATIC CONTROL SYSTEM FOR A RELEASABLE VEHICLE LOCKING DEVICE

[75] Inventor: Scott T. Sikora, Mesa, Ariz.

[73] Assignee: Tomar Electronics, Inc., Tempe, Ariz.

[21] Appl. No.: 738,873

[22] Filed: May 29, 1985

[51] Int. Cl.⁴ .......................................... B65G 69/00
[52] U.S. Cl. ................................ 414/401; 318/626; 318/652; 318/467; 318/468; 414/584
[58] Field of Search ............... 414/584, 401, 396, 537, 414/538; 410/7, 18; 14/695, 71.1, 71.3, 71.5, 71.7, 72.5; 318/626, 382, 467, 468, 652

[56] References Cited

U.S. PATENT DOCUMENTS

| | | | |
|---|---|---|---|
| 2,489,869 | 3/1949 | Dunn | 414/584 |
| 3,694,724 | 9/1972 | Eggert, Jr. | 14/71.5 X |
| 4,127,856 | 11/1978 | Bickel | 14/71.1 X |
| 4,158,799 | 6/1979 | Cappel et al. | 318/626 |
| 4,184,107 | 1/1980 | Turini et al. | 318/626 X |
| 4,264,259 | 4/1981 | Hipp | 414/401 |
| 4,267,748 | 5/1981 | Grunewald et al. | 74/529 |
| 4,443,150 | 4/1984 | Hahn et al. | 414/401 |

FOREIGN PATENT DOCUMENTS 2148617 8/1982 Fed. Rep. of Germany ...... 318/626

OTHER PUBLICATIONS

Rite-Hite ADL-100 Series Dok Lok Owner's Manual.
Rite-Hite Dok Lok Safety Systems advertising brochure (pages unnumbered, all included-published in U.S.A. in 9/1984).

Primary Examiner—Frank E. Werner
Attorney, Agent, or Firm—Cahill, Sutton & Thomas

[57] ABSTRACT

A vehicle to loading dock releasable locking unit includes a hook for engaging a coupling on the vehicle, a motorized drive system for rotating the hook back and forth between locked and unlocked positions, and a hook position sensor for sensing whether the hook is in the locked, the unlocked or an unsafe position between the locked and unlocked positions. The automatic control system includes a hook position selector for generating lock or unlock signals in response to a hook position command selected by an operator and for storing the selected hook position command. A first actuator control unit energizes the hook actuator to reposition the hook into the locked position in response to the lock signal. A second actuator control unit energizes the hook actuator to reposition the hook into the unlocked position in response to the unlock signal. A hook position correction unit is coupled to the hook position sensor and to the hook position selector for comparing the actual hook position with the selected hook position. When an error between the selected hook position and the actual hook position is detected, the hook position correction unit automatically switches into a sag correction mode and generates a hook lock signal to energize the hook actuator to reposition the hook from the unsafe position back into the selected locked position.

17 Claims, 9 Drawing Figures

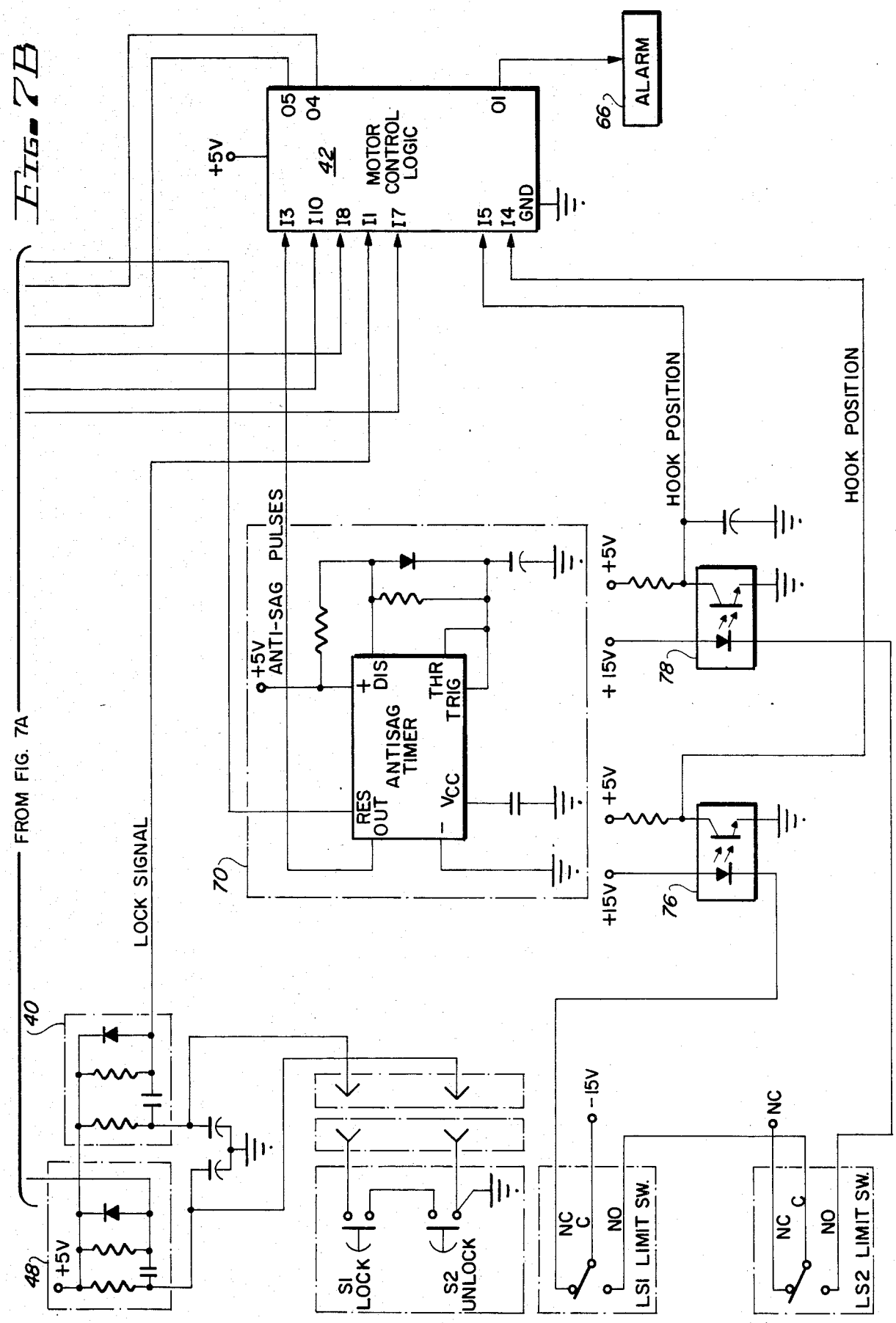

AUTOMATIC CONTROL SYSTEM FOR A RELEASABLE VEHICLE LOCKING DEVICE

BACKGROUND OF THE INVENTION

This invention relates to vehicle to loading dock locking units, and more particularly, to releasable vehicle to loading dock locking units having a displaceable hook for engaging a vehicle bumper.

During loading dock operations involving vehicles such as trucks or trailers, individual workers or a forklift truck are used to repeatedly enter the vehicle to load or unload materials. An extremely dangerous condition may occur if the vehicle suddenly exits the loading dock area without advising warehouse personnel or forklift operators. In the past, releasable vehicle locking devices have been developed which include a motor-actuated hook for engaging the vehicle bumper. Because of the significant and variable vertical loads imposed on a vehicle being loaded or unloaded at a loading dock, the vehicle locking device hook is occasionally downwardly deflected into an unsafe, partially engaged position which actuates a red light and a small horn. When this dangerous condition occurs, warehouse personnel must temporarily discontinue loading operations and reenergize the vehicle locking device control circuit to reset the hook into a safe, fully locked position. If warehouse personnel do not notice the red warning light or hear the warning horn and immediately reengage the hook with the vehicle bumper, it is possible for a vehicle operator to unexpectedly remove the vehicle from the loading dock and endanger workers and forklift loading equipment.

Truck hijackers have discovered that it is possible to manually reposition the vehicle locking system hook, disengage the hook from the vehicle and hijack the vehicle and its valuable contents. Although the existing locking device control circuit illuminates a red light and sounds a warning horn, such passive warning devices do not prevent hijacking.

Because existing vehicle locking systems utilize a clutch for maintaining the hook in fixed engagement with a vehicle bumper, hook displacements out of the locked position may frequently result from clutch wear or improper clutch adjustment. Expensive clutch adjustment or replacement is frequently necessary.

SUMMARY OF THE INVENTION

It is therefore a major object of the present invention to provide an automatic control system for a hook-actuated vehicle to loading dock locking unit which continuously senses hook position and which automatically repositions the hook into the locked position immediately after the hook is displaced from the locked, safe position into an unsafe, intermediate position between the locked and unlocked positions.

Another object of the present invention is to provide an automatic control system for a hook-actuated vehicle to loading dock locking unit where the hook repositioning mode is automatically terminated after a predetermined time to prevent damage to system components.

Another object of the present invention is to provide an automatic control system for a hook-actuated vehicle to loading dock locking unit which prevents the hook from being manually detached from a vehicle when the system is operating in the lock mode.

Yet another object of the present invention is to provide an automatic control system for a hook-actuated vehicle to loading dock locking unit which utilizes an existing loading dock locking unit and an existing hook position sensing mechanism to provide a hook position feedback signal to the automatic control system.

Still another object of the present invention is to provide an automatic control system for a hook-actuated vehicle to loading dock locking unit which can be retrofitted to an existing unit without changing the unit structure, component parts or electrical wiring.

Yet another object of the present invention is to provide an automatic control system for a hook-actuated vehicle to loading dock locking unit which sounds an alarm when the automatic hook repositioning system is actuated.

Briefly stated, an in accord with one embodiment of the invention, an automatic control system is provided for a releasable locking device which secures a parked vehicle to an adjacent structure. The locking device includes a hook for engaging a coupling on the vehicle. Actuating means drives the hook into a locked position where the hook engages the coupling or into an unlocked position where the hook clears the coupling. Hook position sensor means senses whether the hook is in the locked, the unlocked or in an unsafe position between the locked and unlocked positions. The automatic control system includes hook position selector means for generating lock or unlock signals in response to a hook position command selected by an operator and for storing the selected hook position command. First actuator control means energizes the hook actuator means to reposition the hook into the locked position in response to the lock signal. Second actuator control means energizes the hook actuator means to reposition the hook into the unlocked position in response to the unlock signal. Hook position correction means is coupled to the hook position sensor means and to the hook position selector means for comparing actual hook position with selected hook position. The hook position correction means switches into a hook position correction mode and generates a hook lock signal when the locked position has been selected and the hook is displaced into the unsafe position to thereby automatically energize the hook actuator means to reposition the hook from the unsafe position back into the selected, locked position.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein

FIGS. 7A and 7B when taken together in the manner indicated represents an electrical schematic diagram of the preferred embodiment of the automatic control system of the present invention.

DESCRIPTION OF THE PREFERRED EMBODIMENT

Figure 1:
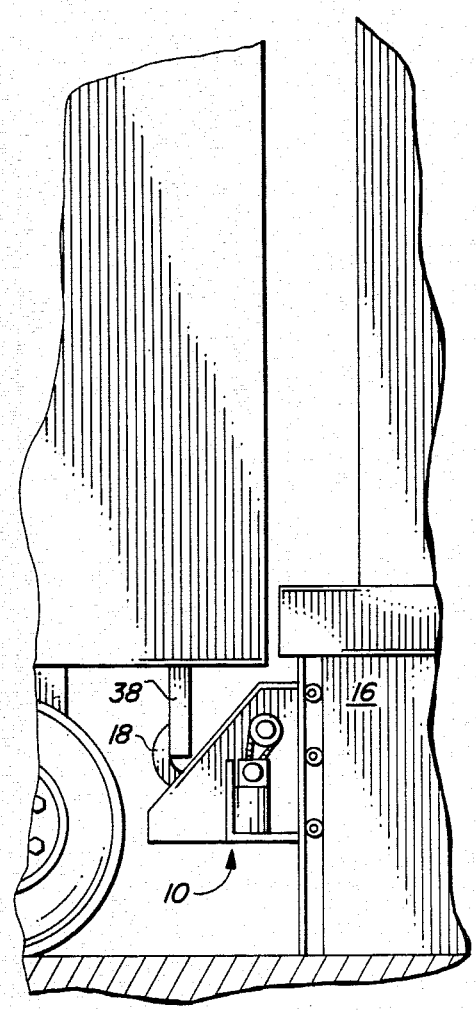
FIG. 1 is a partially cutaway elevational view depicting the manner in which the hook of the releasable vehicle locking device engages an ICC bumper bar located in the lower rear section of a vehicle.

In order to better illustrate the advantages of the invention and its contributions to the art, a preferred hardware embodiment of the invention will now be described in detail.

Referring now to FIGS. 1-5, the prior art releasable vehicle locking device which interfaces with the automatic control system of the present invention will now be described in detail. The locking device 10 includes a plurality of spaced apart rollers 12 which are vertically displaceable within a track 14 which is rigidly secured to the exterior vertical face of a building loading dock 16. Locking device 10 includes an angularly rotatable hook 18, a hook drive shaft 20, a hook housing 22 and a hook drive system indicated generally by reference number 24.

Hook drive system 24 includes a dual field, reversible electric motor 26, a gear reduction unit 28, a drive chain 30 and a drive gear 32 which is rigidly coupled to shaft 20. A clutch assembly maintains hook 18 in a fixed position after the motor has been deenergized. Cams 34 and 36 are rigidly coupled to an end of hook drive shaft 20 and are engaged by limit switches LS$_1$ and LS$_2$. Each limit switch includes a spring biased shaft which serves as a cam follower.

Figure 3B:
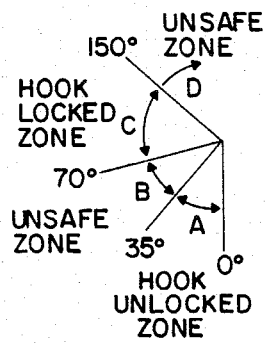
FIG. 3B is a diagram which illustrates the angular ranges of the hook support shaft that correspond to the different hook zones.
Figure 3A:
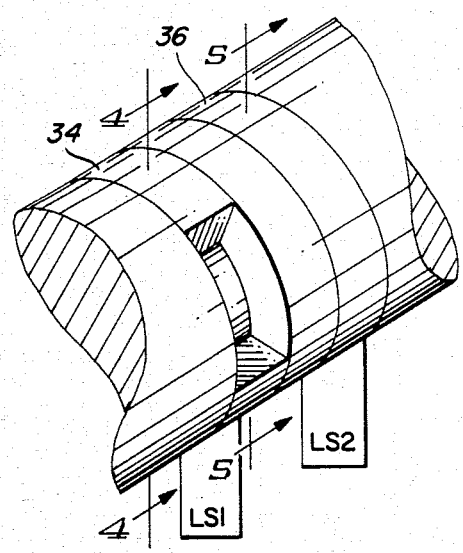
FIG. 3A is a partially cutaway perspective view of the cam-actuated hook position sensing system which forms a part of the present invention.
Figure 4:
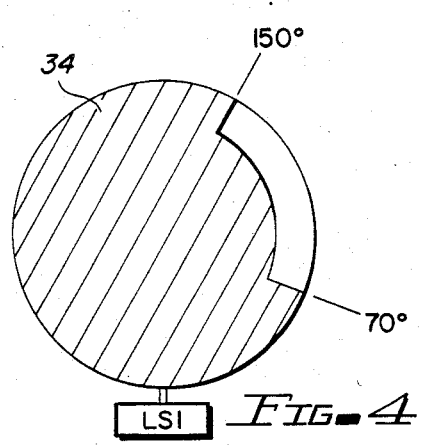
FIG. 4 is a sectional view of the first cam depicted in FIG. 3A, taken along section line 3—3, specifically depicting the cam contour.
Figure 5:
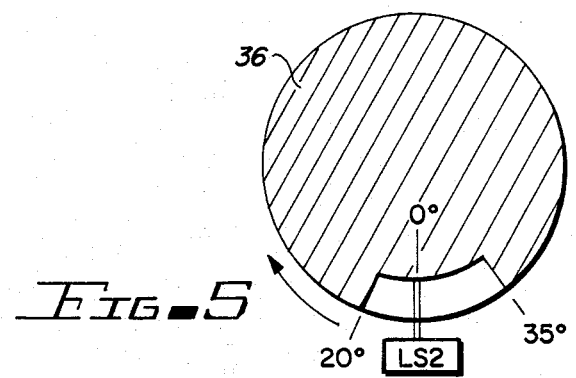
FIG. 5 is a sectional view of the second cam depicted in FIG. 3A, taken along section line 5—5, specifically depicting the cam contour.

FIGS. 4 and 5 specifically depict the contour of cams 34 and 36. The high cam contour depicted in FIG. 4 depresses the shaft of limit switch LS$_1$. FIG. 5 depicts limit switch LS$_2$ with the shaft in the fully extended position. FIG. 3B specifically discloses the relationship between hook zone, hook angle, and limit switch configuration.

Vehicles with which the releasable locking device are compatible include a vertically disposed barrier 38 to minimize the risk of another vehicle underrunning the vehicle in a rear end collision. Barrier 38 is required by Interstate Commerce Commission regulations and is referred to in the industry as an "ICC bumper." When a vehicle approaches a loading dock 16 equipped with locking device 10, hook 18 is placed in the "unlocked" zone (State "A") as illustrated in FIG. 3B where the hook rotational angle is between zero degrees and thirty-five degrees. In the fully stowed position, the tip of hook 18 does not extend out of hook housing 22 and a vehicle can back directly up to loading dock 16 as illustrated in FIG. 1. Once the vehicle is parked, hook 18 of locking device 10 is rotated into the hook locked zone depicted in FIG. 1 where hook 18 firmly engages bumper 38 and locks the vehicle against loading dock 16.

When this hook locked configuration has been attained, a forklift can be maneuvered between the loading dock and the interior of the vehicle to either load or unload material. Vertical vehicle displacements caused by repeated forklift travel into and out of the vehicle coupled with a loose or worn motor clutch 28 can cause hook 18 to be downwardly deflected into the unsafe zone "B" illustrated in FIG. 3B. When hook 18 is in the unsafe zone B, the vehicle is no longer securely engaged with locking device 10 and can roll or be driven away from loading dock 16. Such unexpected vehicle movement can cause a forklift entering or leaving the vehicle to either collide with loading dock 16 or fall to the ground. Serious property damage and physical injury are likely in either event. Although the prior art control system for the vehicle locking device discussed above includes a warning system which actuates a red light and a horn, this prior art system does not include any means for automatically correcting the unsafe hook condition described above and commonly referred to as "hook sag." On the contrary, once a locking system operator or forklift driver notices the unsafe condition indicated by a red light or horn, that individual could only reset the system from the unsafe or hook sag configuration into the hook locked configuration by returning to the locking device control panel and reenergizing motor 26.

The prior art locking device 10 includes a cam/limit switch system which may be modified as described below to provide an appropriate hook position input signal for the automatic control system of the present invention. The operation of this automatic control system will now be described by reference to FIGS. 6, 7A and 7B.

Figure 6:
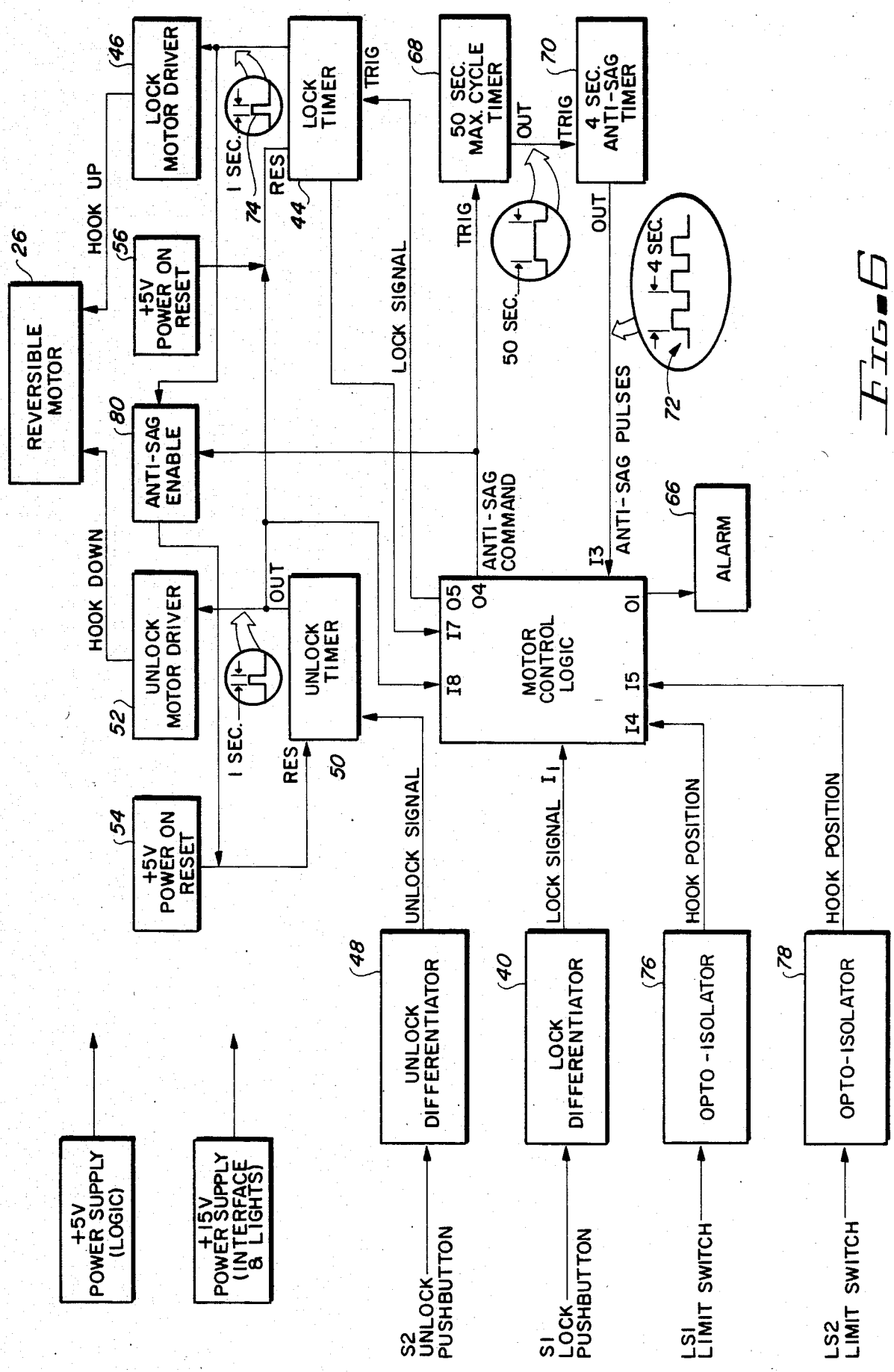
FIG. 6 is a block diagram representation of the automatic control system of the present invention.
Figure 7A:
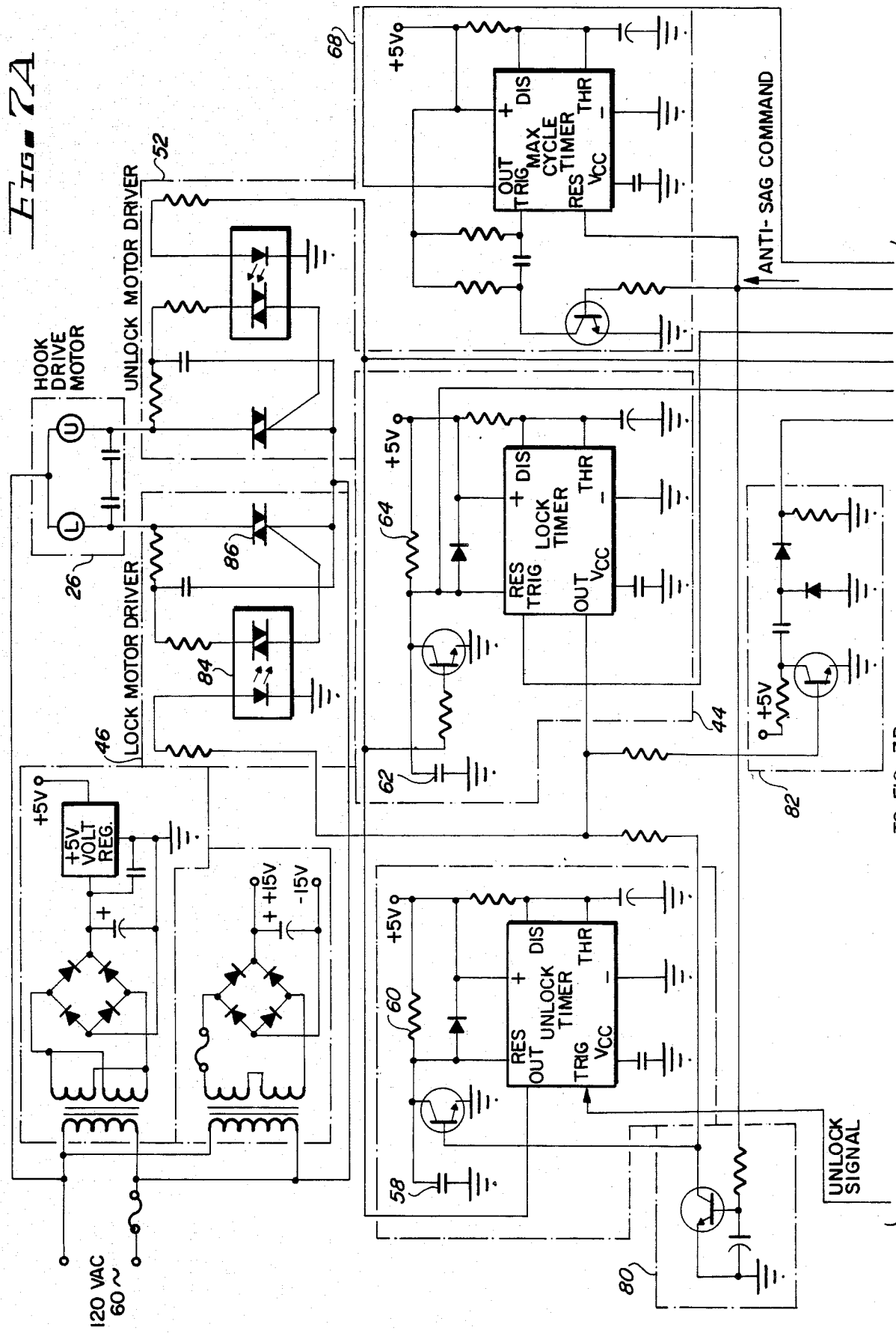

FIG. 6 represents a generalized block diagram depiction of the automatic control system of the present invention, while FIGS. 7A and 7B when taken together illustrate the specific electrical component interconnections utilized in the preferred embodiment of the present invention. Limit switches LS$_1$ and LS$_2$ have been wired as indicated in FIG. 7A and operate as hook position sensor means in accordance with the parameters recited in the State Table included below:

| HOOK STATE TABLE | | | | |
|---|---|---|---|---|
| State | Hook Angle | Hook Zone | LS$_1$ | LS$_2$ |
| A | 0°-35° | Unlocked | depressed | released |
| B | 35°-70° | Unsafe | depressed | depressed |
| C | 70°-150° | Locked | released | depressed |
| D | >150° | Unsafe | depressed | depressed |

In order to explain the structure and operation of the present invention, normal operation of the invention will initially be described followed by a description of the hook sag correction system and the operation of that circuit to reposition the hook from the unsafe zone B into the hook locked zone C.

All of the electronic elements of the present invention depicted in FIGS. 7A and 7B are normally housed in an enclosure located in the interior of a warehouse including a loading dock 16. The face of this control panel includes a lock push button S$_1$ and an unlock push button S$_2$. Momentary actuation of the lock push button by a system operator creates a voltage pulse of indeterminate pulse width. This voltage pulse is communicated to lock differentiator 40 which generates an output pulse with a fixed pulse width. This controlled pulse width lock signal is communicated to input I1 of motor control logic unit 42. In the preferred embodiment of the invention, a 16L8 programmed array logic (PAL) device manufactured by MMI of Sunnyvale, Calif. is used to receive the various input signals generated by the present invention and to generate a logically related series of output signals. To produce system operation as described below, motor control logic unit 42 is programmed according to the following logic diagram:

| I1  | 02    | 03  | I5 | I8   | I10  | I4  | I3  | I7  | GND |
|-----|-------|-----|----|------|------|-----|-----|-----|-----|
| I1  | 05    | 13  | 04 | 06   | 16   | 17  | 18  | 19  | VCC |
| If  | (VCC) | /04 | =  | 06   |      |     |     |     |     |
|     |       |     | +  | /I10 |      |     |     |     |     |
|     |       |     | +  | /I4* | I5   |     |     |     |     |
| IF  | (VCC) | /05 | =  | /I1  |      |     |     |     |     |
|     |       |     | +  | I3   |      |     |     |     |     |
| IF  | (VCC) | /06 | =  | /I8* | I10* | I1* | /06 |     |     |
|     |       |     | +  | /I8* | I10* | I1* | I7* | /I4 |     |

The transmission of a lock signal to input I1 of logic unit 42 causes a corresponding output signal to be immediately communicated to logic unit 42 output 05 which is coupled to the trigger input of lock timer 44. In response to this controlled pulse width input signal, lock timer 44 generates an output signal having a one second pulse width. This timed output signal is coupled to the input of lock motor driver unit 46 which applies 120 volts AC to the lock winding of motor 26. Lock timer 44 and lock motor driver 46 serve as first actuator control means for energizing motor 26. When the lock winding of motor 26 is energized, the motor output shaft rotates in a first direction causing hook 18 to rotate from the hook unlocked zone A into the hooked locked zone C as depicted in FIG. 3B. The locking device 10 has been carefully designed to ensure that the application of a one second power pulse to motor 26 will consistently actuate hook 18 from the hook unlocked zone A into the hook locked zone C. The motor clutch assembly under normal conditions maintains hook 18 in the hook locked zone C.

When a system operator desires to release locking device 10 from bumper 38 of a vehicle, the operator depresses unlocked push button S2 which causes unlock differentiator 48 to transmit a controlled pulse width unlock signal to the trigger input of unlock timer 40. Unlock timer 50 then immediately transmits a one second pulse width output signal to unlock motor 42 which applies 120 volts AC to the unlock winding of motor 26 for the entire one second duration of the output pulse from unlock timer 50. Unlock timer 50 and unlock motor driver 52 operate as second actuator control means for energizing motor 26.

The timed output pulse from unlock timer 50 is simultaneously fed to the reset input of lock timer 44 which maintains lock timer 44 in the reset mode for the entire one second duration of the unlock timer output pulse and prevents simultaneous actuation of both the unlock and lock timers as a result of an improper operator input to the lock push button immediately after actuation of the unlock push button. This feature of the invention prevents the lock winding of motor 26 from being actuated at the same time that the unlock winding is actuated by unlock timer 50.

Power on reset circuits 54 and 56 maintain both unlock timer 50 and lock timer 44 in the reset mode when electrical power is initially applied to the control system of the present invention to prevent actuation of either motor winding until the output voltage from both power supplies has been stabilized and until the various electronic elements of the present invention has achieved a stabilized operating mode. In the preferred embodiment of the invention, the power on reset circuit 54 includes a capacitor 58 and resistor 60. Power on reset circuit 56 includes capacitor 62 and resistor 64.

In the preferred embodiment of the present invention, motor control logic unit 42 is programmed to sound an alarm 66 when lock push button S1 is actuated and hook 18 is displaced into either unsafe zone B or unsafe zone D as depicted in FIG. 3B without having initially been stabilized in hook locked zone C. Initial deflection of hook 18 into unsafe zone B normally indicates that the vehicle is improperly parked at loading dock 16 and that bumper 38 or some other vehicle structure is interfering with the operation of hook 18. The system is designed not to correct for this specific, sequenced deflection from hook unlocked zone A into unsafe zone B. When this sequence occurs, alarm 66 sounds to indicate to the system operator that a visual inspection of the system is required. Alarm 66 may be either a visual warning system, an audible warning system or a combination of both visual and audible warning systems.

If actuation of lock push button S1 causes hook 18 to be deflected from the hook unlocked zone A into the hook unsafe zone D as designated in FIG. 3B, it is probable that the system has been actuated without the presence of a vehicle at loading dock 16. With this specific operational sequence, motor control logic unit 42 is programmed to sound alarm 66 and to take no corrective action to reposition hook 18. An operator should depress the unlock pushbutton to reposition hook 18 into the hook unlocked zone.

If after hook 18 has been displaced from the hook unlocked zone A into hook locked zone C, has stabilized in hook locked zone C and is subsequently displaced into unsafe zone B, motor control logic unit 42 is programmed to both sound alarm 66 and to generate an anti-sag output command at output terminal 04. The anti-sag command is communicated to the trigger input of fifty second timer 68 which generates an output pulse having a fifty second duration. This fifty second output pulse is transferred to the trigger input of a four second anti-sag timer 70. Logic unit 42, timer 58 and anti-sag timer 70 operate as hook position correction means to automatically reposition hook 18 from unsafe zone B into locked zone C.

Anti-sag timer 70 generates a square wave output signal having a four second period as indicated by timing diagram 72. This series of anti-sag pulses is communicated to input I3 of motor control logic unit 42 and is immediately routed to logic unit 42 output terminal 05 and to the trigger input of lock timer 44. At four second intervals, the leading edge of each anti-sag pulse triggers lock timer 44 to generate a one second output pulse which actuates lock motor driver unit 46 and the lock winding of motor 26 for one second. The first one second lock timer output pulse is designated in timing diagram 72 by reference number 74.

If a single one second lock timer output pulse repositions hook 18 from unsafe zone B into hook locked zone C, the Hook State Table indicates that limit switch LS1 will transition from the depressed configuration to the released configuration and that limit switch LS2 will remain in the depressed configuration. As indicated by FIGS. 6 and 7B, the contacts of limit switch LS1 are coupled to the input of optoisolator 76 while the contacts of limit switch LS$_2$ are coupled to the input of optoisolator 78. The hook position outputs from optoisolators 76 and 78 are coupled respectively to inputs I4 and I5 of motor control logic unit 42 and provide a means for logic unit 42 to continuously monitor the position of hook 18. Since the Hook State Table has been programmed into logic unit 42, contact closure changes in LS$_1$ and LS$_2$ instantly indicate when hook 18 transitions from unsafe zone B into the hook locked or safe zone C. Until logic unit 42 determines that the hook 18 has been rotated into the hook locked zone C, logic unit 42 will maintain an anti-sag command signal on output 04 and anti-sag timer 70 will continue to generate the series of pulses illustrated in timing diagram 72 which are communicated to input I3 of logic unit 42. In response to the leading edge of each anti-sag pulse, output 05 of logic unit 42 transmits a one second lock signal at four second intervals to the input of lock timer 44. Lock motor driver 46 is therefore actuated for one second every four seconds to energize the lock winding of motor 26. As soon as logic unit 42 detects a transition of hook 18 from unsafe zone B into locked zone C, the anti-sag command is removed from logic unit 42 output 04 and the control system of the present invention is switched out of the sag correction mode. Transition from the sag correction mode into the normal operating mode may occur after a single anti-sag pulse or may require an extended series of anti-sag pulses.

When timer 68 has reached the end of its fifty second cycle, its high logic level output to anti-sag timer 70 is removed and the control system automatically transitions out of the sag correction mode. A fifty second limit on the sag correction mode is used to prevent motor burn out from a long sequence of power pulses to motor 26. If the sag correction cycle described above fails to reposition hook 18 into locked zone C, logic unit 42 will continue to activate alarm 66 or may transition alarm 66 into a different alarm mode such as a high repetition rate audible or visual alarm. System operator intervention is necessary at this time since an uncorrectable and dangerous hook status has been detected by the automatic control system of the present invention.

FIGS. 6 and 7A indicate that an anti-sag enable circuit 80 has been provided to permit unlock push button S$_2$ to actuate unlock timer 50 and the unlock motor winding to deflect hook 18 into the hook unlocked zone A. During a sag correction cycle, anti-sag enable circuit 80 removes the reset signal from unlock timer 50, permitting unlock push button S$_2$ to actuate unlock timer 50. At the same time, a reset signal is transmitted to the reset input of fifty second timer 68. Actuation of unlock push button S$_2$ during a sag correction cycle immediately terminates that cycle and actuates motor 26 to reposition hook 18 into the hook unlock zone A.

As illustrated in FIG. 7A, the input of transistor switching circuit 82 is coupled to the output of lock timer 44 and transmits a feedback signal corresponding to lock timer output pulses to input I7 of motor control logic unit 42.

As illustrated in FIG. 7A, the circuitry used to implement lock motor driver 46 and unlock motor driver 52 is identical. When optoisolator 84 receives a one second output pulse from lock timer 44, an internal triac is energized which turns on triac 86 and couples the 120 volt AC power input across the lock winding of motor 26 to energize motor 26.

Figure 2:
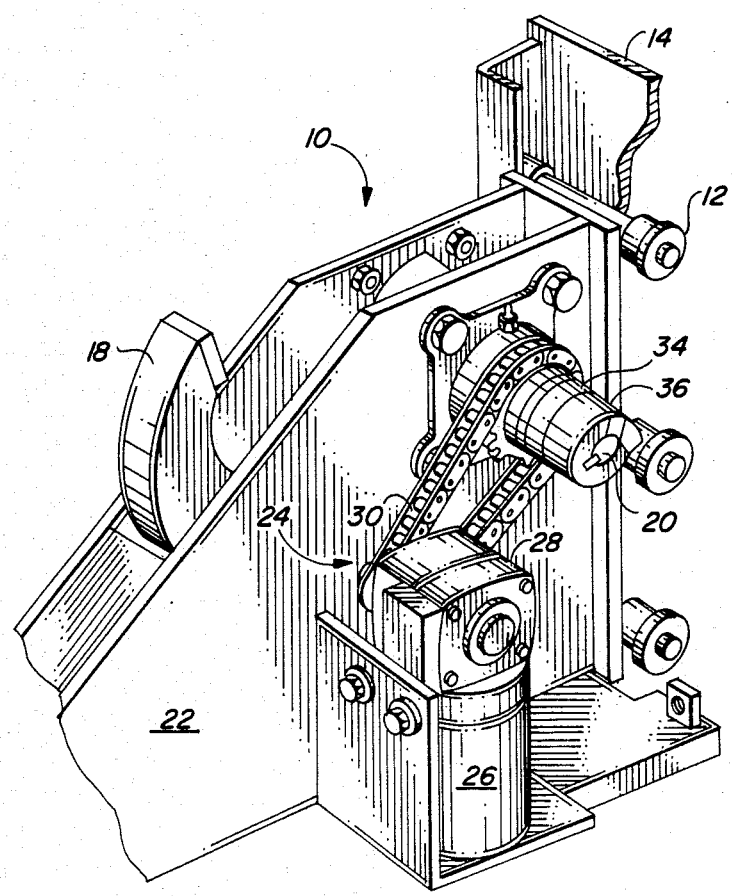
FIG. 2 is a partially cutaway perspective view of the releasable vehicle locking device depicted in FIG. 1, particularly depicting the motor actuated, chain-driven mechanism which rotates the vehicle-engaging hook between the unlocked and locked positions.

The feedback controlled, sag compensation system of the present invention substantially enhances the safety of and operator confidence in the prior art locking device 10 described in connection with FIGS. 1 and 2. Because the limit switch/cam sensing system of the prior art locking device may be electrically reconfigured as illustrated in FIG. 7B without mechanically reconfiguring any elements of locking device 10, the automatic control system of the present invention can be easily substituted for the prior art push button/mechanical timer control circuit formerly used to operate locking device 10.

Another key advantage of the automatic control system of the present invention is its ability to prevent truck hijacking. With the prior art control circuit, a truck hijacker could physically reposition hook 18 from hook locked zone C through unsafe zone B into unlocked zone A without great difficulty and hijack a supposedly locked vehicle. The fact that the prior art locking control circuit actuated a red light and a warning horn did not prevent hijacking. With the automatic control system of the present invention, deflection of hook 18 out of hook locked zone C into unsafe zone B instantaneously actuates the sag correction system of the present invention and immediately repositions hook 18 back into hook locked zone C. Unless extraordinary and unprecedented measures are taken by hijackers, hook 18 cannot be manually disengaged from bumper 18.

With the prior art control circuit, wear or improper adjustment of the motor clutch caused normal forklift induced truck bed displacements to deflect hook 18 into unsafe zone B. When the forklift operator noticed the alarm signal generated by the prior art control circuit, he stopped his vehicle, dismounted, walked over to the control panel and depressed the lock push button to return hook into the hook locked zone C. To minimize such time wasting hook reset procedures, the clutch system of motor 26 had to be either readjusted periodically or replaced at a significant expense.

Utilization of the automatic control system of the present invention with its sag-correction feature enables the system to instantaneously sense hook sag induced by forklift operation and to immediately and automatically reposition hook 18 into the hook locked zone C. For an extended period of time, the sag correction system of the present invention can automatically compensate for hook sag problems caused by an improperly adjusted or partially worn out clutch assembly thereby substantially decreasing clutch maintenance costs and substantially extending effective clutch life.

It will be apparent to those skilled in the art that the preferred embodiment of the automatic control system invention described above may be modified in numerous ways and may assume many different embodiments. For example, a mechanical or digitally programmable locking system may be interposed between the lock and unlock push buttons and other system components to prevent system operation by unauthorized personnel. Numerous other different types of hook position sensing systems could easily be substituted for the mechanical cam plus limit switch system described above. The control system may also be readily modified to operate hydraulically or pneumatically actuated vehicle locking devices. Various types of highly sophisticated alarm systems or hook position indicating systems could easily be adapted to function in response to a variety of different output signals which either are or could be generated by motor control logic unit 42. In addition, motor control logic unit 42 could be replaced by a micro processor computer to perform the same or more sophisticated functions of the type described above. Accordingly, it is intended by the appended claims to cover all such modifications of the invention which fall within the true spirit and scope of the invention.

What is claimed is:

1. An automatic control system for a releasable locking device which secures a parked vehicle to an adjacent structure including
   i. a hook for engaging a coupling on the vehicle;
   ii. means for actuating said hook into a locked position where said hook engages said coupling or into an unlocked position where said hook clears said coupling; and
   iii. hook position sensor means for sensing whether said hook is in the locked, the unlocked or an unsafe position between the locked and unlocked positions;
wherein said automatic control system comprises:
   a. hook position selector means for generating lock or unlock signals in response to a hook position command selected by an operator and for storing the selected hook position command;
   b. first actuator control means for energizing said hook actuator means for a predetermined time interval to reposition said hook into the locked position in response to the lock signal;
   c. second actuator control means for energizing said hook actuator means to reposition said hook into the unlocked position in response to the unlock signal;
   d. hook position correction means coupled to said hook position sensor means and to said hook position selector means for comparing actual hook position with the selected hook position and for switching into a hook sag correction mode to generate a hook lock signal when the lock position has been selected and the hook is displaced into the unsafe position to automatically energize said hook actuator means for repositioning said hook from the unsafe position back into the selected, locked position; and
   e. control means for sensing the stored hook position command and the output of said hook position sensor means, for comparing the stored hook position command with the hook position at the end of the predetermined time interval, and for disabling said hook position correction means if the hook position at the end of the predetermined time interval is either unlocked or unsafe.

2. The automatic control system of claim 1 wherein said hook position correction means while in the sag correction mode compares actual hook position with the selected hook position and removes the hook lock signal after the hook is displaced back into the locked position.

3. The automatic control system of claim 1 wherein said hook position correction means generates a series of hook lock signals for periodically energizing said hook actuator means until the hook is displaced into the locked position.

4. The automatic control system of claim 3 wherein said control means terminates the series of hook lock signals generated by said hook position correction means after a predetermined time regardless of hook position.

5. The automatic control system of claim 4 further including means for sounding an alarm upon activation of said terminating means.

6. The automatic control system of claim 1 wherein said vehicle includes a semi-trailer, wherein said vehicle locking system is aligned with a loading dock and wherein said vehicle coupling includes a horizontally oriented bar coupled to the lower, rear section of said semitrailer.

7. The automatic control system of claim 1 wherein said hook is coupled to and driven by a shaft and wherein said hook position sensor means includes means for measuring the rotary position of said shaft and generating a shaft position signal.

8. The automatic control system of claim 7 wherein said hook position correction means receives the shaft position signal to determine actual hook position.

9. The automatic control system of claim 8 wherein said rotary position measurement means includes
   a. a cam assembly coupled to said shaft; and
   b. cam following limit switches for engaging said cam assembly and generating the shaft position output signal.

10. The automatic control system of claim 9 wherein said cam assembly includes
    a. a first cam for indicating the locked position of the hook; and
    b. a second cam for indicating the unlocked position of the hook.

11. The automatic control system of claim 7 wherein said hook actuating means includes a reversible electric motor coupled to rotate said hook shaft.

12. The automatic control system of claim 11 wherein said first actuator control means further includes lock timer means for receiving the lock signal and energizing said motor to operate for a predetermined time in a first direction.

13. The automatic control system of claim 12 wherein said second actuator control means further includes unlock timer means for receiving the unlock signal and energizing said motor to operate for a predetermined time in a second direction.

14. The automatic control system of claim 1 wherein said first and second actuator control means includes power on reset means for temporarily disabling said first and second actuator control means to prevent hook movement in response to initial power application to said control unit.

15. The automatic control system of claim 1 further including means for sounding an alarm when the hook is actuated into the unsafe position without first stabilizing in the locked position.

16. The automatic control system of claim 1 wherein said control means disables said hook position correction means if the stored hook position command is unlock.

17. The automatic control system of claim 16 wherein said control means disables said hook position correction means after said hook position correction means has been operating in the hook sag correction mode for more than a predetermined time interval.

* * * * *